UNITED STATES PATENT OFFICE.

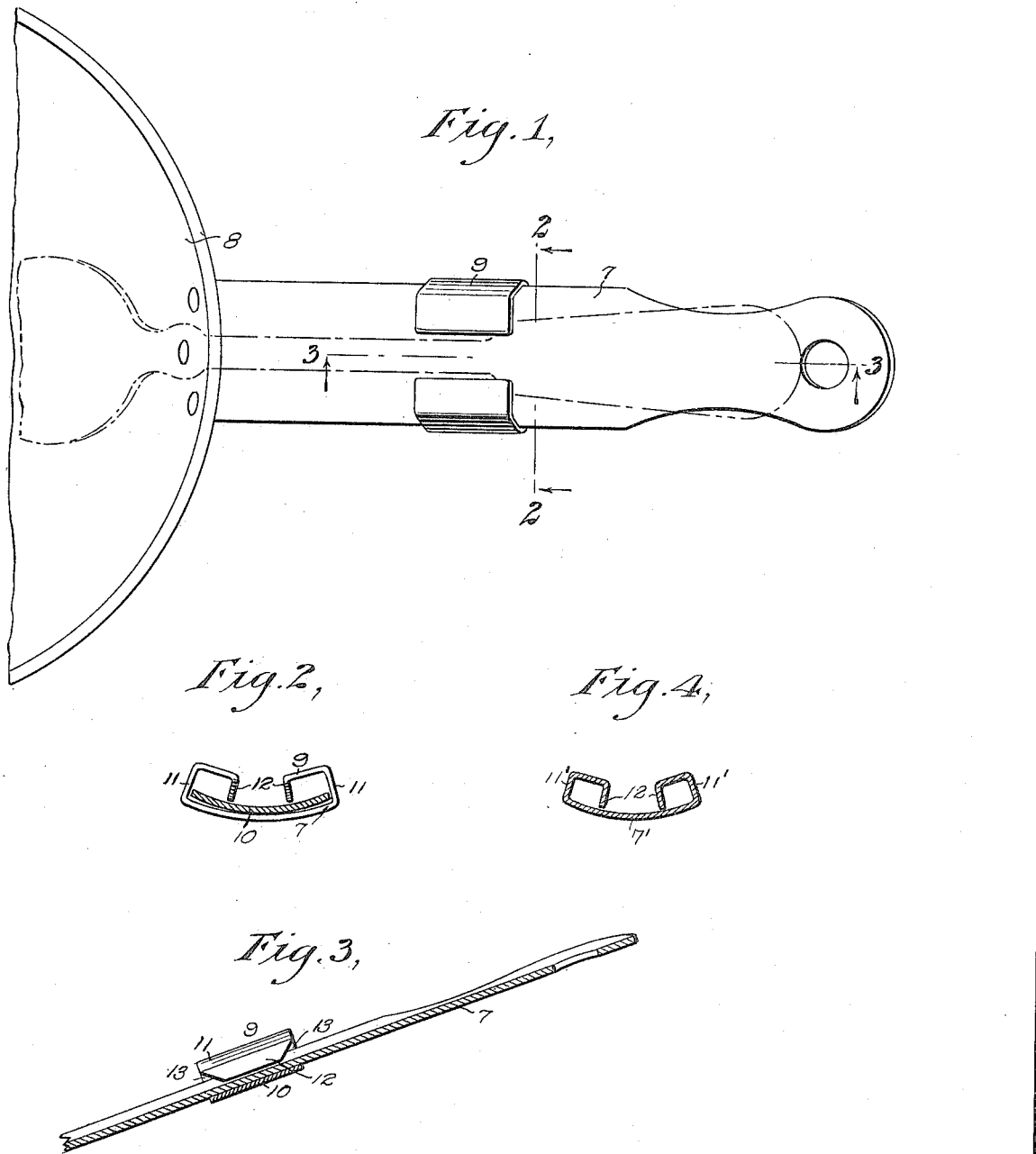

CONRAD HAUF, JR., OF NEW YORK, N. Y.

HANDLE ATTACHMENT.

1,196,543.  Specification of Letters Patent.  Patented Aug. 29, 1916.

Application filed July 2, 1915. Serial No. 37,714.

*To all whom it may concern:*

Be it known that I, CONRAD HAUF, Jr., a citizen of the United States, and a resident of the city of New York, borough of Brooklyn, in the county of Kings and State of New York, have invented a new and Improved Handle Attachment, of which the following is a full, clear, and exact description.

My invention relates to handle attachments, and has reference more particularly to an attachment for handles of utensils, and particularly kitchen utensils.

The object of the invention is to provide a simple, convenient, and inexpensive attachment which forms a holder for the handle of a utensil for the shanks of cutlery or any other article used with the utensil, provided the same has a shank.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a plan view of a utensil handle provided with an embodiment of my invention; Fig. 2 is a cross section on line 2—2, Fig. 1; Fig. 3 is a longitudinal section on line 3—3, Fig. 1; and Fig. 4 is a cross section through a handle in which the holder forms an integral part thereof.

Referring to the drawings, 7 represents a handle of any utensil 8. Mounted on the handle is a holder 9, the bottom 10 of which contacts with the under side of the handle. The sides 11 of the holder, which form the continuation of the bottom, have the extremities 12 thereof bent to face the bottom 10 of the holder and so spaced therefrom that they clear the upper surface of the handle 7. When the holder is not secured to the handle by rivets but is detachable therefrom, the distance between the sides 11 is substantially equal to the width of the handle so that there is a tight fit therebetween and the holder 9 can be positioned at any desired place on the handle. The extremities 12 of the holder form yielding prongs between which the shank of an article can be forced and retained, but the said prongs 12 will retain a shank of a lesser thickness if the same has an enlarged portion at the end thereof, that is, a shouldered shank as shown in dotted lines in Fig. 1, the shouldered shank being that of a spoon. The prongs 12 have their ends 13 beveled, as best seen in Fig. 3, so that when the shank is not large enough to be yieldingly retained by the prongs the shoulders of the shank will then engage the beveled portion 13 of the prongs. The shoulders of the shank will be slightly below the sides 11, and there will be no danger of the same dropping out from engagement with the holder, and the article, whether in the shape of cutlery or otherwise, will rest on the handle whereon it is retained by the holder provided on the handle.

In Fig. 4 the holder forms an integral part of the handle. In this structure the handle is formed with lateral extensions 11' which are bent so that the extremities 12' thereof are turned inwardly to face the upper surface of the handle thereof and constitute prongs for engaging the shank of the article, as previously described. In this structure the beveled ends of the prongs do not need to be provided on both sides but only on the side nearer to the free end of the handle, for the holder is not detachable. It is self-evident that when the holder is riveted to the handle, the beveled ends 13 of the prongs will only be provided on the end of the holder adjacent the free end of the handle.

I claim:

1. In combination with a handle of the class described a cutlery holder having spaced yielding prongs to frictionally engage the handle whereby the same can be retained at any point of the handle, the end edges of the prongs being beveled so that the shoulders of the shanks of cutlery articles may be brought slightly beyond the edge of the yielding prongs.

2. As an article of manufacture, a cutlery holder comprising an elongated blank the end portions of which are bent inwardly so that the end edges of the blank will face the blank, said bent portions of the blank forming spaced yielding prongs, the side edges of the blank adjacent the end edges being beveled substantially as and for the purposes set forth.

In testimony whereof I have signed my name to this specification in the presence of two subscribing witnesses.

CONRAD HAUF, Jr.

Witnesses:
B. Joffe,
Philip D. Rollhaus.

Copies of this patent may be obtained for five cents each, by addressing the "Commissioner of Patents, Washington, D. C."